(12) United States Patent
McCardle (10) Patent No.: US 7,269,721 B2
(45) Date of Patent: Sep. 11, 2007

(54) METHOD, SYSTEM, AND APPARATUS FOR BOOTING WITH REMOTE CONFIGURATION DATA

(75) Inventor: William M. McCardle, Spring, TX (US)

(73) Assignee: Intel Corporation, Santa Clara, CA (US)

( * ) Notice: Subject to any disclaimer, the term of this patent is extended or adjusted under 35 U.S.C. 154(b) by 352 days.

(21) Appl. No.: 10/217,599

(22) Filed: Aug. 13, 2002

(65) Prior Publication Data

US 2004/0034763 A1    Feb. 19, 2004

(51) Int. Cl.
*G06F 9/00*    (2006.01)

(52) U.S. Cl. .................. 713/1; 713/2; 709/220

(58) Field of Classification Search .......... 713/1, 713/2; 709/220
See application file for complete search history.

(56) References Cited

U.S. PATENT DOCUMENTS

| | | | |
|---|---|---|---|
| 5,901,310 A * | 5/1999 | Rahman et al. ............. | 713/1 |
| 6,080,207 A * | 6/2000 | Kroening et al. ........... | 717/172 |
| 6,101,601 A * | 8/2000 | Matthews et al. .......... | 713/2 |
| 6,272,628 B1 * | 8/2001 | Aguilar et al. ............ | 713/2 |
| 6,421,776 B1 | 7/2002 | Hillis et al. .............. | 713/2 |
| 6,421,777 B1 | 7/2002 | Pierre-Louis et al. ...... | 713/2 |
| 6,446,203 B1 * | 9/2002 | Aguilar et al. ............ | 713/2 |
| 6,567,911 B1 * | 5/2003 | Mahmoud ................. | 713/2 |
| 6,611,915 B1 * | 8/2003 | Kubik et al. .............. | 713/200 |
| 6,826,710 B2 * | 11/2004 | Merkin et al. ............. | 714/6 |
| 7,073,053 B1 * | 7/2006 | Oz et al. ................... | 713/2 |
| 2002/0099804 A1 * | 7/2002 | O'Connor et al. ......... | 709/220 |

OTHER PUBLICATIONS

"Power-On Self-Test Extension Providing Remote Program Load Capability For Communication Cards", *IBM technical disclosure bulletin, 32, No. 10A*, (Mar. 1, 1990), 288-292.
"Windows Remote-Boot Quick Guide", *Rembo Technology*, www.bppatch.org, (Oct. 30, 2000), 1-4.

* cited by examiner

*Primary Examiner*—Chun Cao
(74) *Attorney, Agent, or Firm*—Schwegman, Lundberg, Woessner & Kluth, P.A.

(57) ABSTRACT

Method, apparatus and computer software provide for the loading of configuration data from a remote source to set the initial configuration of a computing system during a boot process. One or more software components are operable on the computing system to determine if configuration data is to be retrieved from a remote source, configure a network interface and determining if the network is active, establish a route to a server storing the configuration data, download the configuration data from the server to the computing system, verify that the configuration data was received correctly, and use the downloaded configuration data to at least in part set the initial configuration of the computing system. When remote data is unavailable, configuration data from a local source is used to set the initial configuration of the computing system. A determination of whether to retrieve configuration data from a remote source is done by checking a setting in local configuration data stored in a local nonvolatile storage device. According to various embodiments, large networks of servers are managed in a dynamic manner using the remote loading of configuration data.

19 Claims, 5 Drawing Sheets

METHOD, SYSTEM, AND APPARATUS FOR BOOTING WITH REMOTE CONFIGURATION DATA

TECHNICAL FIELD OF THE INVENTION

The present invention relates to the field of electronic data processing devices, and more particularly, to the operation of a computing system.

BACKGROUND OF THE INVENTION

Conventional computing systems use a basic input output system (BIOS) stored in system firmware in order to "boot" the processor into operation. During the boot process, configuration data required to set initial settings of the system are retrieved using a firmware configuration utility. In some BIOS/firmware architectures these configuration settings are stored in a system non-volatile memory, such as a CMOS component. Other BIOS/firmware implementations store this data in the same nonvolatile memory on which the firmware resides. In either event, because configuration data is obtained from the local non-volatile memory, updates to configuration data must first be applied to this memory before it is effective. Such updates, therefore, require one or more software processes operative on the computing system to load updated configuration data into the non-volatile memory.

DETAILED DESCRIPTION OF THE INVENTION

In the following detailed description, numerous specific details are set forth in order to provide a thorough understanding of the present invention. However, it will be understood by those skilled in the art that the present invention may be practiced without these specific details and other embodiments may be utilized and structural changes may be made without departing from the scope of the present invention. In other instances, well-known methods, procedures, components, and circuits have not been described in detail so as not to obscure the present invention.

Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
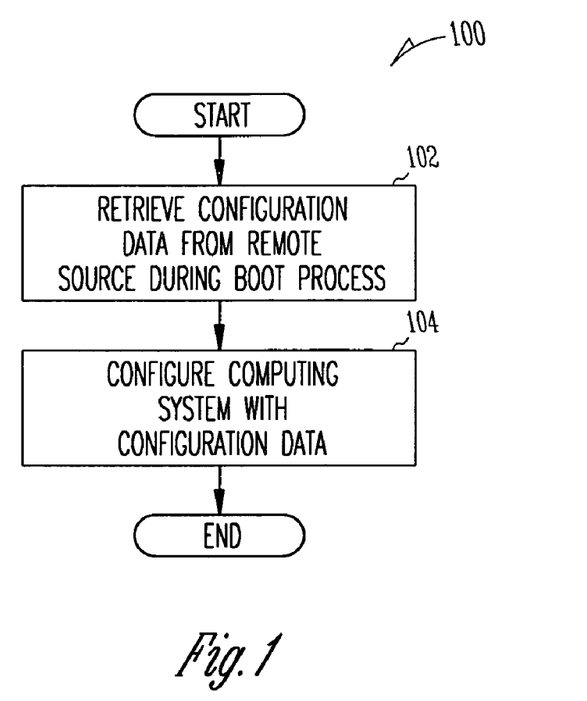
FIGS. 1-4 illustrate in block diagram form various example embodiments of methods according to the present invention.

Referring now to FIG. 1, there is illustrated a first embodiment 100 of a method according to the present invention. According to this embodiment, as shown in flow chart item 102, the method provides for retrieving, during a boot process of a computing system (alternatively referred to as a "machine" herein) configuration data from a source remote from the computing system. The configuration data is then used at least in part to set the computing system's initial configuration, as shown in item 104.

Figure 2:
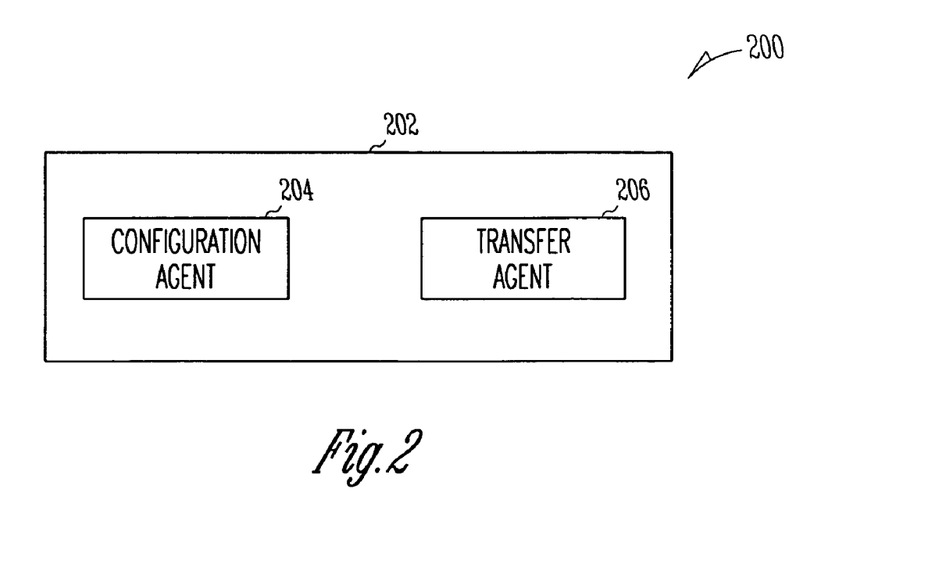

According to one alternate embodiment 200 illustrated in FIG. 2, a method according to the present invention is performed using a driver 202 having a configuration agent 204 and a transfer agent 206 wherein the configuration agent (for example DHCP to establish IP addresses) at least in part assists in establishing a path to the remote source over a network (such as an IP network), and the transfer agent (for example TFTP) at least in part manages the transfer of the configuration data from the remote source to the computing system. According to still another example embodiment, the method includes determining if the configuration data should be retrieved from a remote source prior to being retrieved, and if not, retrieving the configuration data from a local source. In still another example embodiment of the method of the invention, the driver is stored locally in the computing system in a compressed state, for example in a nonvolatile memory containing a system BIOS, and unexpanded if needed in a boot process.

Figure 3:
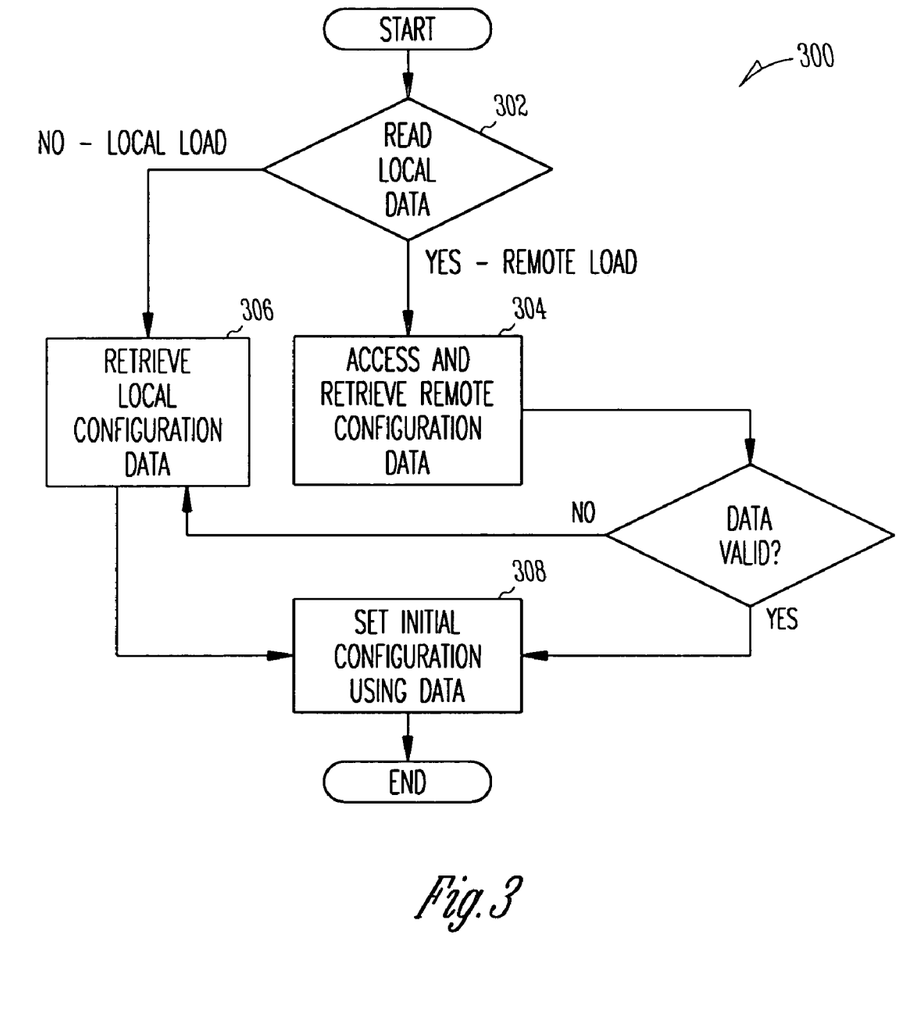

According to still another example embodiment 300 of a method according to the present invention illustrated in FIG. 3, a computing system reads locally stored data to determine if configuration data is to be retrieved from a remote source, as shown in flow chart item 302. As shown in item 304, if the configuration data is to be retrieved from a remote source, the remote source is accessed to retrieve the configuration data. If the configuration data is not to be retrieved from a remote source or the data retrieved remotely is invalid, the configuration data is retrieved from a local source, as shown in flow chart item 306. The configuration data from either the local or remote source is then used at least in part to set the initial configuration of the computing system, as represented by item 308. According to one example embodiment, the above-described process is performed during boot up of the computing system.

Figure 4:
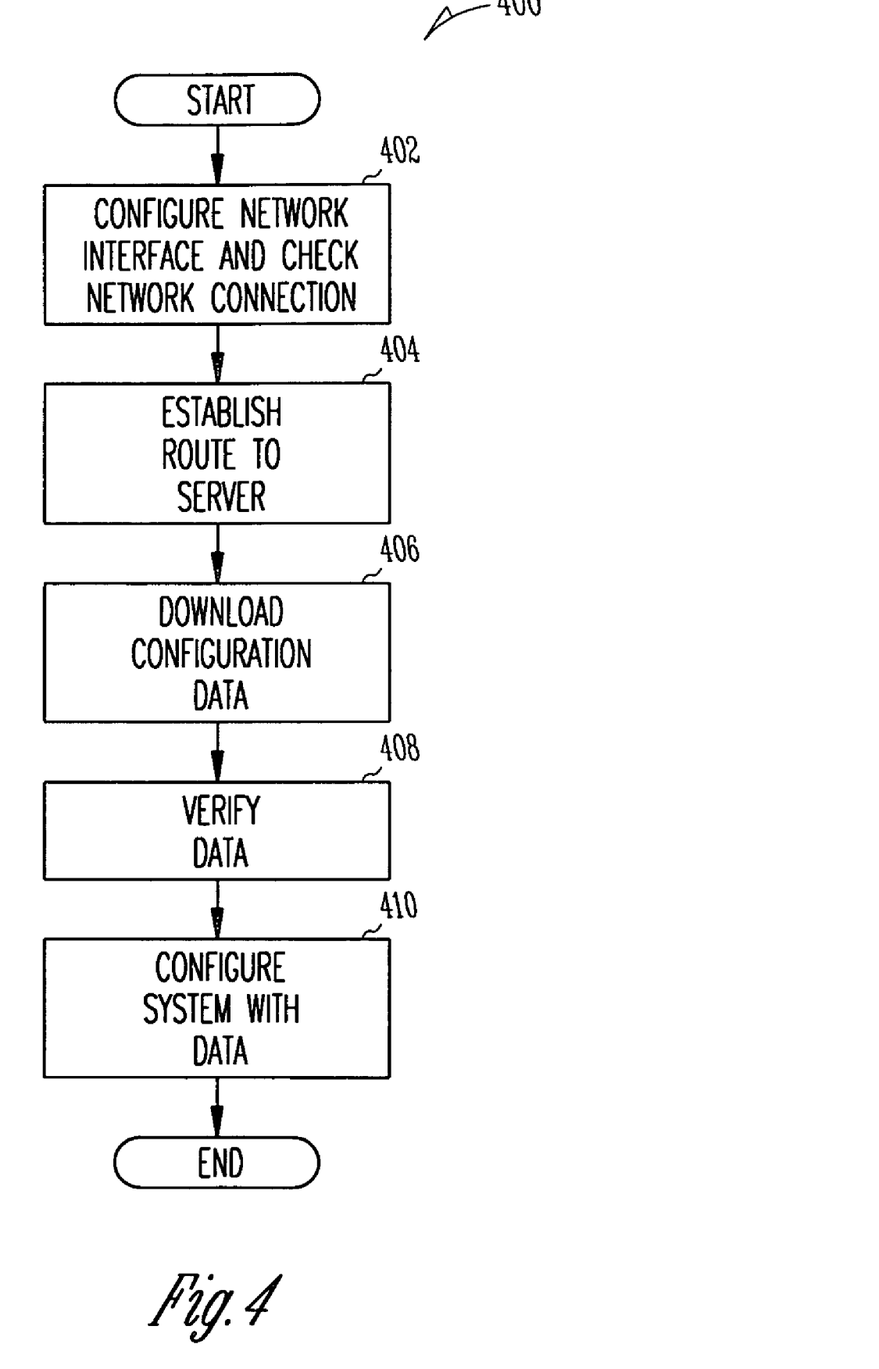

According to still another example embodiment 400 of a method according to the present invention illustrated in FIG. 4, the configuration data is retrieved from a remote source, such as a server computer, over a network. In this embodiment, a network interface is configured and determines if the network is active, as shown in item 402. If the network is active, a route is established to the remote source storing the configuration data, as illustrated in item 404. As shown in item 406, the configuration data is then downloaded from the remote source to the computing system, and, as shown in item 408, checked to verify that the configuration data was received correctly. The verified downloaded configuration data is then used at least in part to set the initial configuration of the computing system, as shown in item 410. According to still another example embodiment, if remote source configuration data is not available or cannot be downloaded properly, configuration data is obtained from a local source and used to set the initial configuration of the computing system. According to yet another example embodiment of the invention, a setting in a locally stored data source, for example a nonvolatile BIOS memory, is checked to determine if configuration data is to be retrieved from a remote source.

Figure 5:
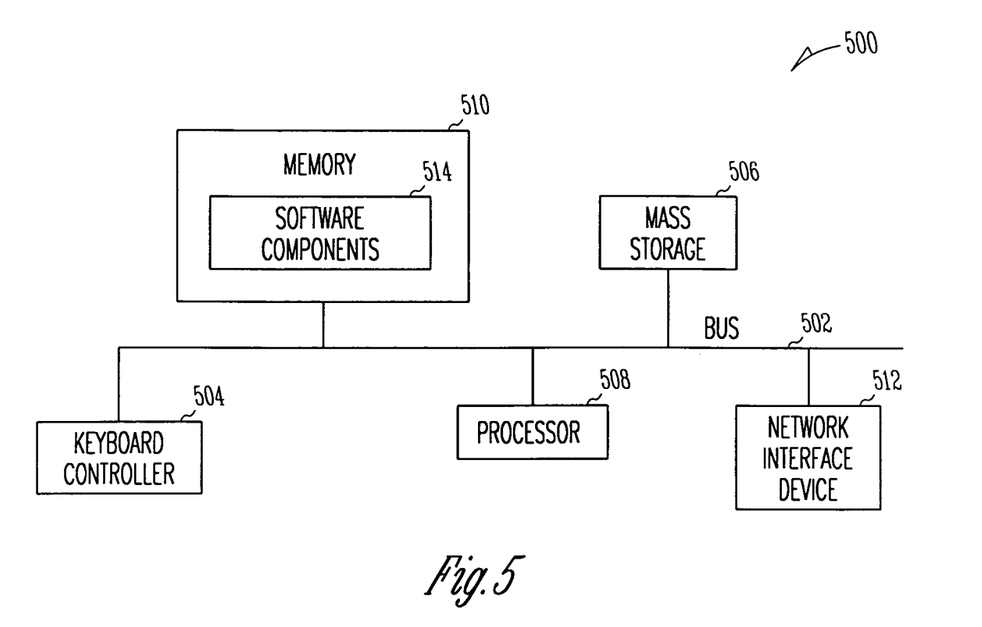
FIG. 5 illustrates a simplified overview of a computing system according to one example embodiment of the invention.

Referring now to FIG. 5, there is illustrated a simplified overview of a computing system 500 according to one embodiment of the invention. The computing system comprises bus 502, keyboard controller 504, external memory 510, mass storage device 506, processor 508 and non-volatile system memory 510 that, in one embodiment, stores the system firmware. Bus 502 can be a single bus or a combination of multiple buses and provides communication links between components in the computing system. Keyboard controller 504 can be a dedicated device or can reside in another device such as a bus controller or other controller. Keyboard controller 504 allows coupling of a keyboard to the computing system and transmits signals from a keyboard to the computing system. External memory 510 can comprise a dynamic random access memory (DRAM) device, a static random access memory (SRAM) device, or other memory devices. External memory 510 stores information from mass storage device 506 and processor 508 for use by processor 508. Mass storage device 506 can be a hard disk drive, a floppy disk drive, a CD-ROM device, or a flash memory device. Mass storage device 506 provides information to external memory 510. Processor 508 can be a microprocessor and is capable of decoding and executing a computing program such as an application program or operating system. In addition, system 500 includes a LAN edge or network interface device 512, which permits system 500 to communicate with an external network and devices or computing systems, such as clients and servers, connected to that network.

One or more software components 514 are stored in non-volatile memory 510. According to one example embodiment, components 514 execute in processor 508 and read data stored in memory 510 or another non-volatile memory in the computing system in order to determine if configuration data is to be retrieved from a remote source. If it is to be retrieved from a remote source, components 514 operate to retrieve the configuration data from the remote source through network interface device 512. Alternatively, if the configuration data is not to be retrieved from a remote source, components 514 retrieve the configuration data from a local source such as, in one example embodiment, non-volatile memory 510 or an alternate non-volatile memory in computing system 500. In the event configuration data is downloaded from a remote source, components 514 verify that the downloaded configuration data is complete and ready for use. If it is not, configuration data is instead obtained from the local source. Once the configuration data is retrieved, components 514 use it at least in part to set the initial configuration of the computing system 500.

According to still another example embodiment illustrated also with respect to the embodiment shown in FIG. 2, the software components 514 include a first software component 202 that is a configuration agent which at least in part assists in establishing a path to the remote source over a network through the network interface device 512, and a second software component 204 that is a transfer agent that at least in part manages the transfer of the configuration data from the remote source to the computing system. According to still another example embodiment, components 514 are stored in memory 510 in a compressed form, and uncompressed into a disposable area of memory form when needed during a boot process.

Figure 6:
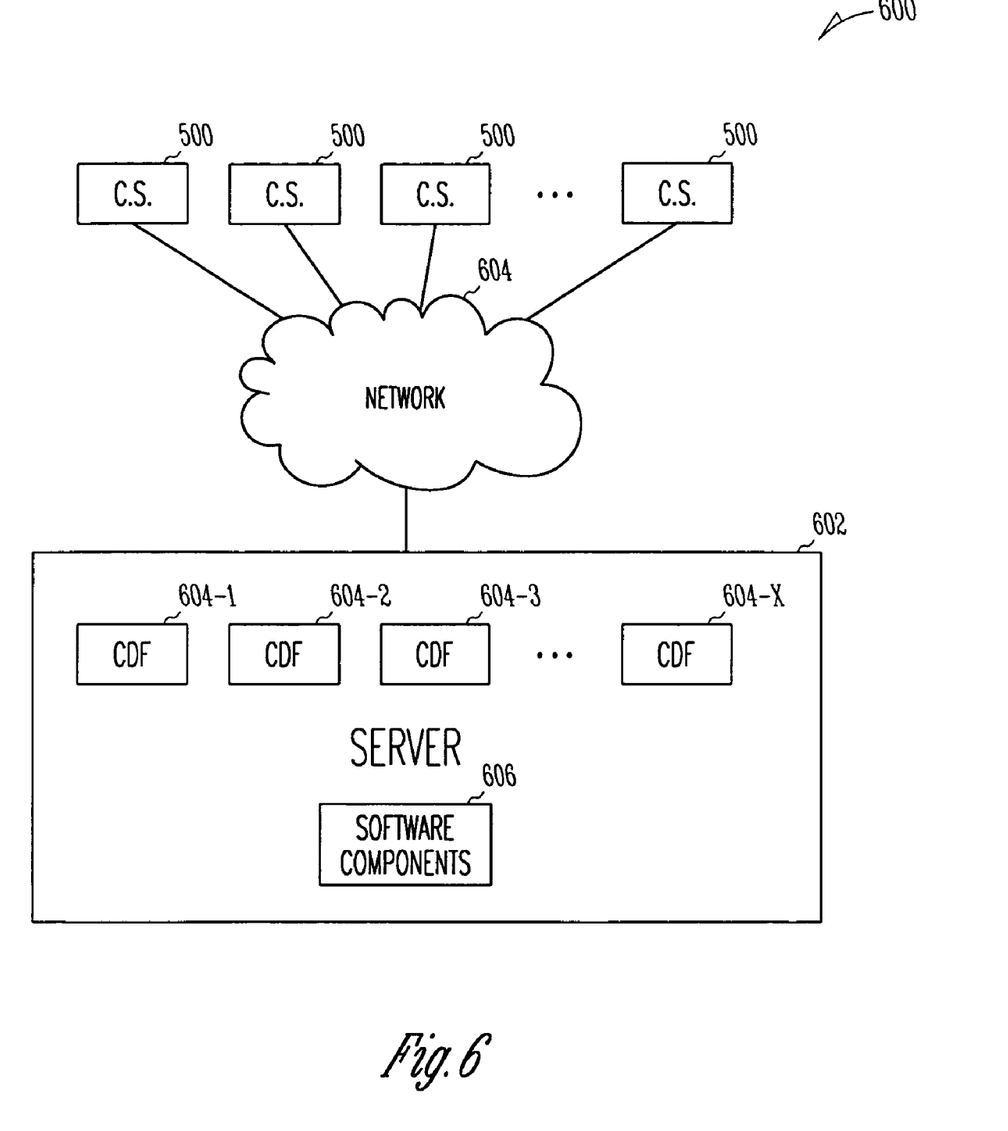
FIG. 6 illustrates an example embodiment of a network architecture according to one example embodiment of the present invention.

Referring now to FIG. 6, there is illustrated a network architecture 600 which includes a plurality of computing systems 500 connected to a server 602 through a network 604. Server 602 maintains "remote" configuration data 604, making it available to be downloaded by any one of computing systems 500 upon request from those systems. According to one example embodiment, a configuration data file 604-1, 604-2, 604-3 . . . 604-X is stored for each computing system 500. In this embodiment, each computing system 500 requests the configuration data file 604-X corresponding to it. In one embodiment, the data file for each computing system is named using the file naming convention used by the server 602. In one example embodiment, software components 514 in one or more of computing systems 500 operate to retrieve a configuration data file 604-X through network interface device 512 and network 604, for example using a file transfer protocol such as a TFTP protocol.

According to still another example embodiment, server 602 includes software components 606 capable of communicating with machines 500 using packet termed without limitation "CONFIGREQUEST" and "CONFIGREPLY" packets. Based on the packet type, the server 602 can then identify the configuration data file or image to be sent back to the requesting machine 500 via, for example, TFTP transfers. According to one embodiment, the CONFIGREQUEST packet specifies the configuration data image by specifying a null-terminated filename. In this embodiment, for instance, each of the configuration data image filenames on the server are specified by using the system board's vital product data identity (VPDID) string to precede a revision number and a "cfg" filename extension. In one example embodiment, the server will assume the highest numbered revision if the client's CONFIGREQUEST packet specifies a "0000" as the revision number. If a file for the requester's (client's) system board is not found—having the same VPDID string as the requester's VPDID—a CONFIGREPLY packet is not sent to the requester. According to this embodiment, the booting system times out on the CONFIGREQUEST if the correct configuration data image is not located using the remote configuration method, and enables the requestor to proceed by retrieving the configuration information locally using a standard firmware set of application programming interfaces (APIs) as a safe alternative. If the requested configuration data image file is found at the remote location, a CONFIGREPLY packet is returned to the requestor machine 500 that then loads the configuration data into its system memory using the standard TFTP agents.

According to still another example embodiment, the CONFIGREPLY packet specifies the length of the file to be loaded. After the configuration data image transfer is completed, if the image size specified in the CONFIGREPLY packet does not match the image size loaded into memory, the computing system 500 firmware will use the local configuration data as a safe default alternative. In the case where the TFTP session succeeded and the configuration data image placed in memory matches the length specified by the CONFIGREPLY packet, the firmware configuration API that used the remote configuration method returns the configuration data retrieved from the remote configuration server 602 instead of the local configuration data.

According to still another example embodiment of the invention, there are provided computer programs for carrying out the methods and system operation described above, wherein the computer programs are stored in whole or in part on one or more computer readable media, such as non-volatile memory on the computing systems described above, or computer disk storage, or other media such as portable media or encoded electronic signals or data passing through a wired or wireless connection.

Thus, as described above, the various embodiments of the present invention are useful to improve the efficiency of network administration by reducing the time and cost of operating a large number of server nodes. Currently, administrators have to address firmware manageability issues by applying changes to each individual machine. The embodiments described herein enable updating part of, or the whole, SAN/network server configuration once instead of having to manage the configuration of each individual machine. This is potentially advantageous for large homogeneous e-business SAN/networks where thousands of identical high-density servers can update their system firmware configuration in less time than it would take to apply the current method of updating the firmware configuration data to a single machine. In addition, the various embodiments of the invention are also useful for updating the configuration data for the commonly homogeneous desktop IT environment.

Further, the embodiments of the present invention can provide for dynamic, rapid re-deployment and utilization of large or even small networks of servers. For example, the system allows any sort of firmware configuration change from across a SAN/network interface. For example, in the large, homogeneous SAN, where service load utilization is critical, thousands of systems could be completely re-configured and re-deployed dynamically by using an artificial intelligence to automate firmware configuration data image generation and system re-initialization. Without the need for human interaction, complex system administration tasks can be performed with relative speed to expedite adjustments to compute power utilization dynamically—bringing the right measure of computing power to individual compute loads at electronic speeds.

Thus, the invention as described above provides various methods and implementations and embodiments for, among other things described above, loading and booting from configuration data stored remotely from a computing system. It shall be understood that the invention may be implemented in a multitude of ways without departing from the scope of the invention as described in the claims appended hereto. For example but without limitation, the invention is in no way limited to the particular systems and methods for downloading configuration data from a remote source as illustrated in the example embodiments herein shown.

The invention claimed is:

1. A method comprising:
   storing at least one software component in a non-volatile memory of a computing system;
   executing in a processor of the computing system during a boot process of the computing system the at least one software component to read data stored in memory in the computing system in order to determine if configuration data is to be retrieved from a source remote from the computing system;
   retrieving, if the configuration data is to be retrieved from the source remote from the computing system, the configuration data from the source remote from the computing system including using a driver having a configuration agent and a transfer agent wherein the configuration agent at least in part assists in establishing a path to the remote source over a network, and the transfer agent at least in part manages the transfer of the configuration data from the remote source to the computing system; and
   using the retrieved configuration data to at least in part set the computing system's initial configuration.

2. The method according to claim 1 further including:
   determining prior to being retrieved from the remote source that the configuration data is not to be retrieved from the remote source; and
   retrieving the configuration data from a local source.

3. The method according to claim 1 further including compressing the driver for local storage in the computing system, and unexpanding the driver when needed in a boot process.

4. A system comprising:
   a computing system;
   a first software component operable on the computing system to obtain configuration data from a source remote from the computing system, wherein the first software component includes a configuration agent which at least in part assists in establishing a path to the remote source over a network, and a transfer agent that at least in part manages the transfer of the configuration data from the remote source to the computing system;
   a second software component operable on the computing system to at least in part set the computing system's initial configuration using the configuration data; and
   a third software component stored in a non-volatile memory of the computing system, the third software component to be executed on a processor of the computing system during a boot process of the computing system and further to read data stored in a memory in the computing system in order to determine if configuration data is to be retrieved from the source remote from the computing system.

5. The system according to claim 4 wherein the third software component further determines, prior to being retrieved from the remote source, that the configuration data is not to be retrieved from the remote source, and if the configuration data is not to be retrieved from the remote source, the third software component further retrieves the configuration data from a local source.

6. The system according to claim 4 including a still further software component for unexpanding a software component when it is needed in a boot process.

7. A method comprising:
   using a processor in a computing system to read locally stored data to determine if configuration data is to be retrieved from a remote source;
   if the configuration data is to be retrieved from a remote source, accessing the remote source to retrieve the configuration data including using a driver having a configuration agent and a transfer agent wherein the configuration agent at least in part assists in establishing a path to the remote source over the network, and the transfer agent at least in part manages the transfer of the configuration data from the remote source to the computing system;
   if the configuration data is not to be retrieved from a remote source, retrieving the configuration data from a local source; and
   using the configuration data retrieved either from the remote source or the local source to at least in part set the initial configuration of the computing system.

8. The method according to claim 7 further wherein the computing system reads the locally stored data during boot up of the computing system.

9. A system comprising:
a computing system;
one or more software components to be executed on a processor and operable on the computing system to:
a) read locally stored data to determine if configuration data is to be retrieved from a remote source;
b) if the configuration data is to be retrieved from a remote source, accessing the remote source to retrieve the configuration data;
c) if the configuration data is not to be retrieved from a remote source, retrieving the configuration data from a local source; and
d) at least in part set the initial configuration of the computing system using the configuration data retrieved either from the remote source or the local source;
wherein the one or more software components include a driver having a configuration agent and a transfer agent, the configuration agent at least in part assists in establishing a path to the remote source over the network, and the transfer agent at least in part manages the transfer of the configuration data from the remote source to the computing system.

10. The system according to claim 9 further wherein the locally stored data is stored in non-volatile memory.

11. The system according to claim 9 further wherein the remote source is a server.

12. A method comprising:
using a processor in a computing system to read locally stored data to determine if configuration data is to be retrieved from a source remote from the computing system;
retrieving during a boot process of a computing system configuration data from the source remote from the computing system, including accessing the source remote from the computing system to retrieve the configuration data including using a driver having a configuration agent and a transfer agent wherein the configuration agent at least in part assists in establishing a path to the remote source over the network, and the transfer agent at least in part manages the transfer of the configuration data from the remote source to the computing system;
using the configuration data to at least in part set the computing system's initial configuration;
wherein the computing system includes coupling a plurality of computing systems to at least one server through a network; and
wherein the source remote from the computing system manages at least one configuration of the at least one server by managing the computing system configuration data provided to the at least one server.

13. The method according to claim 12 further including dynamically managing the configuration of a plurality of computing systems from the remote source.

14. The method according to claim 12 further including maintaining in the remote source a separate remote configuration data file for each computing system.

15. A system comprising:
a plurality of computing systems coupled to at least one server through a network;
a first software component operable on each computing system to obtain configuration data from a source remote from the computing system, wherein the first software component includes a configuration agent which at least in part assists in establishing a path to the remote source over a network, and a transfer agent that at least in part manages the transfer of the configuration data from the remote source to the computing system;
a second software component operable on each computing system to at least in part set the computing system's initial configuration using the configuration data; and
a third software component stored in a non-volatile memory of the computing system, the third software component to be executed on a processor of the computing system during a boot process of the computing system and further to read data stored in a memory in the computing system in order to determine if configuration data is to be retrieved from the source remote from the computing system;
the source remote from the computing system operating to configure the at least one server by managing the configuration data provided to the at least one server;
wherein at least one of the first software component and the second software component are stored in a compressed form.

16. The system according to claim 15 further including dynamically managing a firmware configuration of a plurality of computing systems from the remote source.

17. The system according to claim 15 further including maintaining configuration data for each server in an electronic file.

18. An article of manufacture comprising one or more tangible computer readable storage media storing a machine readable computer program executable in a computing system, the machine readable computer program for carrying out system operations comprising:
storing at least one software component in a non-volatile memory of a computing system;
executing in a processor of the computing system during a boot process of the computing system the at least one software component to read data stored in memory in the computing system in order to determine if configuration data is to be retrieved from a source remote from the computing system;
retrieving, if the configuration data is to be retrieved from the source remote from the computing system the configuration data from the source remote from the computing system including using a driver having a configuration agent and a transfer agent wherein the configuration agent at least in part assists in establishing a path to the remote source over a network, and the transfer agent at least in part manages the transfer of the configuration data from the remote source to the computing system; and
using the retrieved configuration data to at least in part set the computing system's initial configuration.

19. An article of manufacture comprising one or more tangible computer readable storage media storing a machine readable computer program executable on a computing system, the machine readable computer program for carrying out system operations comprising:
using a processor in a computing system to read locally stored data to determine if configuration data is to be retrieved from a source remote from the computing system;
retrieving during a boot process of a computing system configuration data from the source remote from the computing system, including accessing the source remote from the computing system to retrieve the configuration data including using a driver having a configuration agent and a transfer agent wherein the configuration agent at least in part assists in establishing a path to the remote source over the network, and the transfer agent at least in part manages the transfer of the configuration data from the remote source to the computing system;

using the configuration data to at least in part set the computing system's initial configuration;

wherein the computing system includes coupling a plurality of computing systems to at least one server through a network; and wherein the source remote from the computing system manages at least one configuration of the at least one server by managing the computing system configuration data provided to the at least one server.

* * * * *